Patented May 10, 1938

2,117,251

UNITED STATES PATENT OFFICE 2,117,251

ANTISTREPTOCOCCIC AGENTS, AND PROCESS OF MAKING THEM

Ervin C. Kleiderer and Horace A. Shonle, Indianapolis, Ind., assignors to Eli Lilly and Company, Indianapolis, Ind., a corporation of Indiana No Drawing. Application July 26, 1937, Serial No. 155,690

9 Claims. (Cl. 260—69)

Our invention relates to certain anti-streptococcic agents, and their salts, of low toxicity and high effectiveness; and to the process of producing them.

In forming our anti-streptococcic agents, we proceed in general as follows:

To a solution of a compound of the following type:

(1) 
$$\begin{array}{c} NH_2 \\ | \\ R \\ | \\ SO_2NH_2 \end{array}$$

in which R is a member of the class consisting of (2) 

p-phenylene and (3) 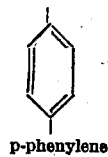

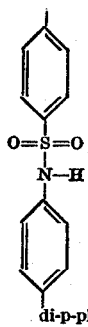

di-p-phenylenesulfonimide and in the presence of excess mineral acid, we add a molecular amount of a solution of a soluble nitrite, such as sodium nitrite, with sufficient rapidity so that a solution of the corresponding diazonium salt is obtained with the formation of relatively little or no precipitate. If the solution is not wholly clear, the relatively slight amount of precipitate formed is suitably removed, as by filtration. Then the solution, or the clear filtrate if filtration is necessary, is treated to reduce its acidity, most conveniently by adding sodium acetate or sodium bicarbonate; which causes the diazonium salt to react with itself, to form a product having a molecular weight slightly more than double that of the compound of Formula (1) above but slightly less than double that of the initial diazonium salt. We believe that this reaction causes the initial diazonium salt to group itself into pairs, with the two members of each pair coupled at two points to form a ring-like structure of the type indicated by the following formula:

(4) 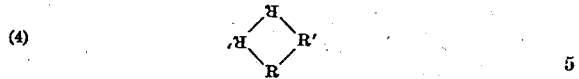

in which R has the same meaning as before, and R' is a keto-enol radical, having the following formula:

(5) 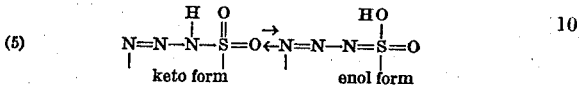

If R is the p-phenylene radical, of Formula 2, we believe that the compound has the following formula:

(6) 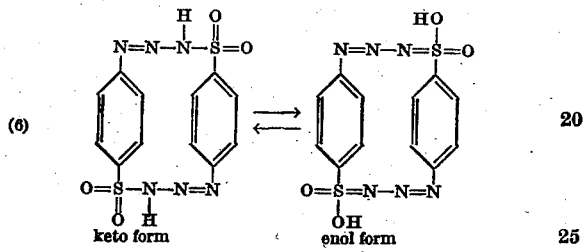

If R is the di-p-phenylenesulfonimide radical, of Formula 3, we believe that the compound has the following formula:

(7) 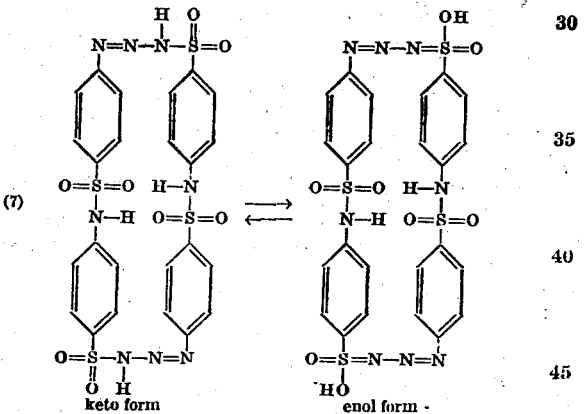

Either of these compounds (Formulas 6 and 7) will form salts of ammonium, alkyl-substituted ammonium, alkanol-substituted ammonium, alkali metals, and alkaline-earth metals, as by reacting such compounds with the corresponding hydroxides; in which salts we believe that the hydrogen of the enol form is substituted by the basic metal or radical. Many of these salts, particularly the ammonium salts and the alkali-metal salts, are quite water-soluble, and are readily available for hypodermic injection.

The following are examples:

Example 1

To a solution of about 500 cc. of concentrated hydrochloric acid in 5 liters of water there is added, conveniently with the materials at room temperature, about 500 gm. of p-aminobenzene-sulfonamide, (8) 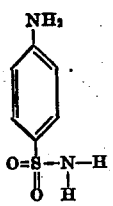

This solution is then cooled, desirably to a temperature of about 10° C. This cooled solution, and a similarly cooled solution of about 208 gm. of sodium nitrite in about 500 cc. of water, are then rapidly mixed, as by dumping one into the other, with vigorous stirring. The mixing of the two solutions is done as quickly as possible, to avoid the formation of a certain undesired insoluble product which is formed when they are mixed gradually. (That undesired insoluble product is the 4:4'-disulfonamido-diazoamino-benzene described at the bottom of page 727 of the Biological Journal for May, 1937.) At this point the solution, which is yellowish in color, should be crystal clear, and generally is; but if it is not it is filtered to obtain a clear solution. On this mixing, the following reaction occurs:

(9) 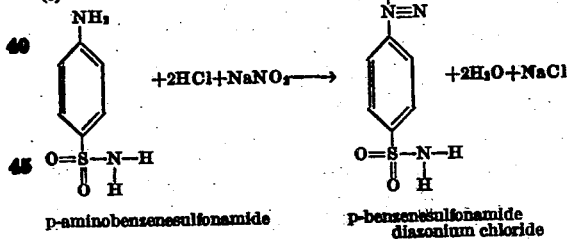

p-aminobenzenesulfonamide     p-benzenesulfonamide diazonium chloride

Sodium acetate is then added to the solution thus produced, with stirring, desirably in sufficient amount to produce maximum precipitation; which usually requires about 1500 gm. The sodium acetate is conveniently added in solid form, although it may be added in water solution. The stirring is continued for two or three hours; although the reaction starts as soon as the addition of sodium acetate occurs. The product of this reaction is obtained as an orange-colored precipitate, which is recovered by filtration. We believe that this precipitate is a cyclic di-triazene; as we believe that it is formed by the following reaction:

(10) 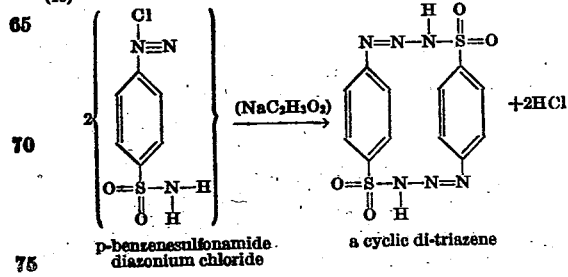

p-benzenesulfonamide diazonium chloride     a cyclic di-triazene

The product thus obtained is substantially insoluble in water and in petroleum ether, and somewhat soluble in alcohol and in ether. On the addition of concentrated sulfuric acid it decomposes with the evolution of gas and the formation of a voluminous light-weight solid that is apparently mostly carbon. When heated gradually it becomes dark by about 240° C., without showing any definite melting point. On oral administration, or on injection in suspension, it is found to have strongly anti-streptococcic action.

From this water-insoluble product, we may form water-soluble salts which also have anti-streptococcic action. This can be done in several ways, but our preferred way is to suspend the insoluble cyclic di-triazene in alcohol and to add an alcoholic solution of sodium hydroxide in slightly less than twice a molecularly equivalent amount. We desirably add about 20 gm. of sodium hydroxide to 100 gm. of the cyclic di-triazene. The reaction ordinarily is fairly rapid, and we believe it is complete within ten or fifteen minutes. After such reaction is substantially complete, we then add sodium bicarbonate in slightly more than sufficient amount to react with the remaining un-reacted cyclic di-triazene. The reason that less than two full molecularly equivalent amounts of sodium hydroxide are used is to avoid possible undesirable alkalinity in the final product; and the reason sodium bicarbonate is not used entirely to form the salt is because the reaction is too slow, although it can be done. We find it well to have the alcohol substantially anhydrous, or as nearly so as convenient, to minimize the amount of water present after the reaction is complete. The reaction which we believe occurs with the sodium hydroxide is as follows:

(11) 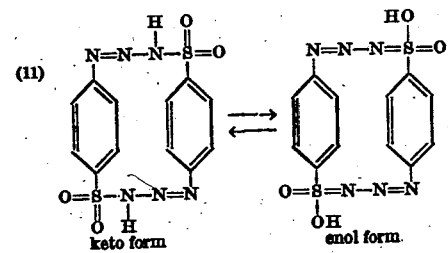
keto form        enol form

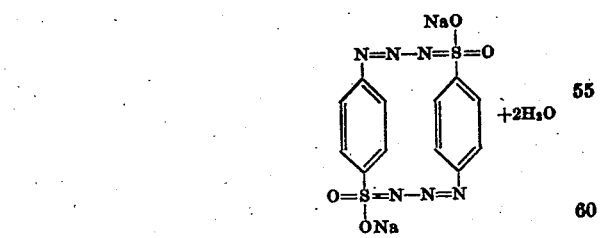

The reaction with sodium bicarbonate is believed to be similar in character, as will be clear.

After the above-described reactions have taken place, the whole is filtered to remove the excess sodium bicarbonate present, along with any other insoluble matter. The filtrate thus obtained is evaporated to dryness, conveniently at not higher than room temperature and desirably in vacuo, to obtain the water-soluble di-sodium salt of the cyclic di-triazene.

Water may be used instead of alcohol in the foregoing reactions.

If in the reaction only one molecular equivalent of the sodium hydroxide and/or sodium bicarbonate is used, the cyclic di-triazene is not wholly reacted, but more than half of it is reacted; which we believe indicates that the reaction product then in solution is a mixture of the mono-sodium salt and the di-sodium salt. So to get the di-sodium salt alone it is desirable to use ultimately two full molecular equivalents of the sodium compounds which are added, as otherwise some of the mono-sodium salt is present. We have not isolated the mono-sodium salt.

Either the di-triazene or its sodium salts may be administered orally, and is effective on such administration as an anti-streptococcic agent. In addition, the sodium salts are quite water-soluble, and may be administered parenterally in water solution. The required curative dosage, by certain tests on white mice, seems to be about 1.5 times as great as that of p-aminobenzenesulfonamide; but its lethal dose, also as tested on white mice, to be only about one-fifth that of p-aminobenzenesulfonamide.

Instead of forming the sodium salt, we may form other salts, such as the potassium salt, the ammonium salt, the ethyl-ammonium salt, the ethanol-ammonium salt, the calcium salt, or the magnesium salt. These are representative of the alkali-metal, alkaline-earth-metal, ammonium, alkyl-substituted-ammonium, and alkanol-substituted-ammonium salts which may be formed. All of these are effective, but we now prefer the sodium salt.

*Example 2*

If instead of starting with p-aminobenzenesulfonamide as the initial compound we start with p-aminobenzenesulfonyl-p'-sulfonamidophenylamide, we get a series of reactions which we believe to be analogous to those indicated in Formulas 9 to 11 inclusive, to obtain a product which we believe to be represented by Formula 7. It is also a cyclic di-triazene.

For ready reference, the formula of p-aminobenzenesulfonyl-p'-sulfonamidophenylamide is as follows:

(12)
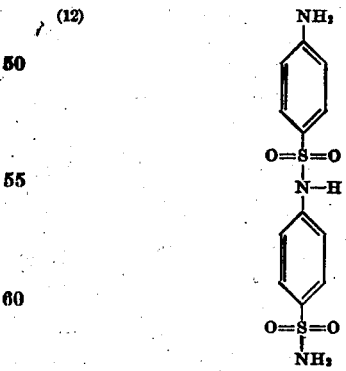

This p-aminobenzenesulfonyl-p'-sulfonamidophenylamide, which we use as an initial compound, is not a product that is new with us, as it has been described at scientific meetings. Its preparation has recently been described in the literature. (Biochemical Journal, vol. 31, pp. 724, 727; May, 1937.)

The final product of Example 2, obtained from the initial compound of Formula 12, will form salts in the same way as does the final product of Example 1.

This final product and its salts are effective as anti-streptococcic agents on oral administration; and the salts may also be administered in water solution, either orally or hypodermically, and are effective as anti-streptococcic agents.

We claim as our invention:

1. The new anti-streptococcic agents, of the class consisting of compounds formed by treating a compound of the following type:

in which R is a member of the class consisting of

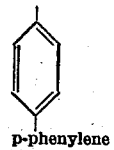

p-phenylene and

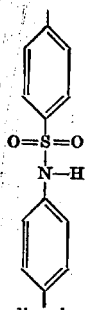

di-p-phenylenesulfonimide with a soluble nitrite in the presence of excess mineral acid to form a diazonium salt of that compound, and then reducing the acidity of the solution to cause the diazonium salt to combine with itself to form a compound of higher molecular weight; and their alkali-metal, alkaline-earth-metal, ammonium, alkyl-substituted-ammonium, and alkanol-substituted-ammonium salts.

2. The new anti-streptococcic agents, of the class consisting of the compound formed by treating p-aminobenzenesulfonamide with a soluble nitrite in the presence of excess mineral acid to form a diazonium salt of that compound, and then reducing the acidity of the solution to cause the diazonium salt to combine with itself to form a compound of higher molecular weight; and its alkali-metal, alkaline-earth-metal, ammonium, alkyl-substituted-ammonium, and alkanol-substituted-ammonium salts.

3. The new anti-streptococcic agents, of the class consisting of compounds formed by treating p-aminobenzenesulfonyl-p'-sulfonamidophenylamide with a soluble nitrite in the presence of excess mineral acid to form a diazonium salt of that compound, and then reducing the acidity of the solution to cause the diazonium salt to combine with itself to form a compound of higher molecular weight; and its alkali-metal, alkaline-earth-metal, ammonium, alkyl-substituted-ammonium, and alkanol-substituted-ammonium salts.

4. The process of producing an anti-streptococcic agent, which consists in treating a compound of the following type:

in which R is a member of the class consisting of

p-phenylene and

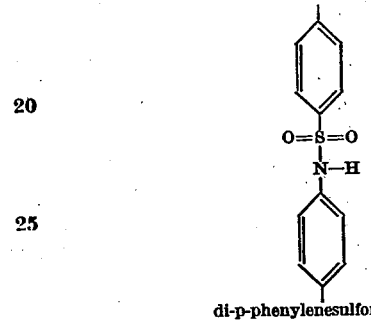

di-p-phenylenesulfonimide with a soluble nitrite in the presence of excess mineral acid to form a diazonium salt of that compound, and then reducing the acidity of the solution to cause the diazonium salt to combine with itself to form a compound of higher molecular weight.

5. The process of producing an anti-streptococcic agent, which consists in treating p-aminobenzenesulfonamide with a soluble nitrite in the presence of excess mineral acid to form a diazonium salt of that compound, and then reducing the acidity of the solution to cause the diazonium salt to combine with itself to form a compound of higher molecular weight.

6. The process of producing an anti-streptococcic agent, which consists in treating p-aminobenzenesulfonyl-p'-sulfonamidophenylamide with a soluble nitrite in the presence of excess mineral acid to form a diazonium salt of that compound, and then reducing the acidity of the solution to cause the diazonium salt to combine with itself to form a compound of higher molecular weight.

7. The process of producing an anti-streptococcic agent as set forth in claim 4, with the addition that the product obtained is treated to cause substitution of hydrogen thereof by a member of the class consisting of the alkali metals, the alkaline-earth metals, ammonium, alkyl-substituted ammonium, and alkanol-substituted ammonium.

8. The process of producing an anti-streptococcic agent as set forth in claim 5, with the addition that the product obtained is treated to cause substitution of hydrogen thereof by a member of the class consisting of the alkali metals, the alkaline-earth metals, ammonium, alkyl-substituted ammonium, and alkanol-substituted ammonium.

9. The process of producing an anti-streptococcic agent as set forth in claim 6, with the addition that the product obtained is treated to cause substitution of hydrogen thereof by a member of the class consisting of the alkali metals, the alkaline-earth metals, ammonium, alkyl-substituted ammonium, and alkanol-substituted ammonium.

ERVIN C. KLEIDERER.
HORACE A. SHONLE.